(12) United States Patent
Chen et al.

(10) Patent No.: US 12,383,997 B2
(45) Date of Patent: Aug. 12, 2025

(54) CROSS-COUPLING CONTROL METHOD FOR MOVING BEAM OF GANTRY MACHINE TOOL

(71) Applicant: Jilin University, Changchun (CN)

(72) Inventors: Chuanhai Chen, Changchun (CN); Zhifeng Liu, Changchun (CN); Jinyan Guo, Changchun (CN); Tongtong Jin, Changchun (CN); Xinyuan He, Changchun (CN); Shuo Zhao, Changchun (CN); Baobao Qi, Changchun (CN); Chunshi Liu, Changchun (CN); Zhaojun Yang, Changchun (CN); Zhijie Li, Changchun (CN); Chunlei Hua, Changchun (CN); Liang Zhang, Changchun (CN); Haoming Yan, Changchun (CN)

(73) Assignee: Jilin University, Changchun (CN)

( * ) Notice: Subject to any disclaimer, the term of this patent is extended or adjusted under 35 U.S.C. 154(b) by 161 days.

(21) Appl. No.: 18/508,333

(22) Filed: Nov. 14, 2023

(65) Prior Publication Data
US 2024/0082966 A1    Mar. 14, 2024

Related U.S. Application Data

(63) Continuation of application No. PCT/CN2023/111894, filed on Aug. 9, 2023.

(30) Foreign Application Priority Data

Aug. 16, 2022  (CN) .......................... 202210980682.1

(51) Int. Cl.
*B23Q 1/62*    (2006.01)
*G05B 6/02*    (2006.01)
*H02P 21/13*   (2006.01)

(52) U.S. Cl.
CPC ............... *B23Q 1/621* (2013.01); *G05B 6/02* (2013.01); *H02P 21/13* (2013.01); *H02P 2207/05* (2013.01)

(58) Field of Classification Search
CPC ...... B23Q 1/621; G05B 6/02; G05B 19/4086; G05B 2219/35356; H02P 21/13;
(Continued)

(56) References Cited

U.S. PATENT DOCUMENTS 5,604,677 A * 2/1997 Brien ................. G05B 19/4068
                                                     700/262
2007/0288101 A1  12/2007 Liu et al.

FOREIGN PATENT DOCUMENTS

CN      107085373 A      8/2017
CN      108363301 A      8/2018
(Continued)

OTHER PUBLICATIONS

International search report of PCT/CN2023/111894.

*Primary Examiner* — David Luo
(74) *Attorney, Agent, or Firm* — Hemisphere Law, PLLC; Zhigang Ma (57) ABSTRACT

A cross-coupling control method for moving beam of gantry machine tool is disclosed, which relates to the technical field of CNC machine tool control. The cross-coupling control method includes: Step 1: establishing a crossbeam dynamics model considering a ram on the crossbeam, and at the same time simplifying the model for an observer design; step 2: realizing a PID control parameter adjustment of motors at both ends in accordance with a method of parameter tuning of a unilateral servo control system; using a servo system with the same control parameters to jointly drive the crossbeam up and down, realizing the synchronous control and realizing PID control parameter tuning for both end motors. The disclosure not only reduces the synchronization error (Continued)

caused by the torsion of the crossbeam, but also solves the synchronization error caused by the asymmetric load on both sides, and improves the system robustness and stability.

10 Claims, 11 Drawing Sheets

(58) Field of Classification Search
CPC .......... H02P 2207/05; H02P 6/04; H02P 6/34; H02P 23/12
USPC ................................................ 318/632, 560
See application file for complete search history.

(56) References Cited

FOREIGN PATENT DOCUMENTS

| | | |
|---|---|---|
| CN | 112828609 A | 5/2021 |
| CN | 112904741 A | 6/2021 |
| CN | 115268369 | 11/2022 |

\* cited by examiner

| Motor three loop | Parameter | Value |
|---|---|---|
| Position loop | Proportional coefficient $K_{p3}$ | 100 |
| Speed loop | Proportional coefficient $K_{p2}$ | 35 |
| | Integral time constant $T_{n2}$ | 0.6 |
| Current loop | Proportional coefficient $K_{p1}$ | 400 |
| | Integral time constant $T_{n1}$ | 1.2 |

CROSS-COUPLING CONTROL METHOD FOR MOVING BEAM OF GANTRY MACHINE TOOL

TECHNICAL FIELD

The present disclosure relates to the technical field of CNC machine tool control, and more specifically, to a cross-coupling control method for moving beam of gantry machine tool.

BACKGROUND ART

As the core of the "industrial machine", the structure and control precision of high-end CNC machine tools are the key links that affect its reliability. The research on the common key technologies of high-end CNC machine tools plays an important role in promoting the development of China's manufacturing industry. As a common high-end CNC machine tool, the moving beam structure of gantry machining center can complete the processing of large mass, large volume and irregular parts through the movement of crossbeam, such as large submarines at sea, key parts of large ships and so on.

The moving beam gantry machining center is more widely used in practice, and ensuring the synchronous driving accuracy of the crossbeam is the key to ensure the machining quality. Therefore, it is of great significance to study the synchronous driving strategy when the crossbeam is moving.

The existing synchronization algorithms of CNC systems seldom consider the change of the center of gravity of the crossbeam caused by the movement of the moving parts on the crossbeam, which leads to a large synchronization error. The synchronization error on both sides of the crossbeam will affect the machining accuracy of the gantry machine tool and reduce the dynamic response of the system, which needs to be improved.

SUMMARY

A purpose of the present disclosure is to provide a cross-coupling control method for moving beam of gantry machine tool to solve the problems proposed in the background technology mentioned above.

In order to achieve the above purpose, the present disclosure provides the following technical solution:
a cross-coupling control method for moving beam of gantry machine tool includes:
Step 1: establishing a crossbeam dynamics model considering a ram on the crossbeam, and at the same time simplifying the model for an observer design;
Step 2: realizing a PID control parameter adjustment of motors at both ends in accordance with a method of parameter tuning of a unilateral servo control system; using a servo system with the same control parameters to jointly drive the crossbeam up and down (symmetrical structure on both sides), realizing the synchronous control;
Step 3: using cross-coupling synchronous control to feedback a mutual influence between two axes, and designing a disturbance observer to compensate an output to the corresponding axis to constitute another closed-loop loop; and
Step 4: designing a disturbance observer and compensating for the disturbance to improve a robustness of the system while reducing a synchronization error.

As a further solution of the present disclosure: the step 1 includes:
Step 11: establishing a three-degree-of-freedom kinematic model of a crossbeam coupled body using a generalized three-degree-of-freedom coordinate system (Z, θ, Y) or a position coordinate system ($Z_1$, $Z_2$, Y);
Step 12: obtaining a differential equation in a crossbeam moving process of the gantry crossbeam mechanism; and
Step 13: simplifying the differential equation in the crossbeam moving process.

As a further solution of the present disclosure: in the step 11: the kinematic model of the crossbeam coupled body is established using a position coordinate system ($Z_1$, $Z_2$, Y) or a generalized three-degree-of-freedom coordinate system (Z, θ, Y):

$$\begin{cases} Z_1 = Z + \frac{L}{2}\sin\theta \\ Z_2 = Z - \frac{L}{2}\sin\theta \\ Y = Y \end{cases} \Leftrightarrow \begin{cases} Z = \frac{Z_1 + Z_2}{2} \\ \theta = \arcsin\left(\frac{Z_1 - Z_2}{L}\right) \\ Y = Y \end{cases}$$

the two models may be converted to each other, wherein:
θ is a deflection angle of the crossbeam, L is a span of the crossbeam, Z is a translational displacement of the crossbeam, Y is a displacement of a moving part from a center of gravity of the crossbeam, and $Z_1$ and $Z_2$ are translational displacements of the two axes.

As a further solution of the present disclosure: in the step 12: a gantry crossbeam rotational inertia J is expressed as:

$$J = \frac{ML^2}{12}; \tag{1}$$

to establish the differential equation in the crossbeam moving process according to the Lagrange equation, it is necessary to define energy expressions related to its dynamics in advance, including kinetic energy T, elastic potential energy V, Rayleigh dissipation function D, beam mass M; moving part mass m, the expressions are as follows:

$$T = \frac{1}{2}(M+m)\dot{z}^2 + \frac{1}{2}(J+my^2)\dot{\theta}^2 + \frac{1}{2}m\dot{y}^2 + m\dot{y}\dot{z}\theta\cos\theta + m\dot{z}\dot{y}\sin\theta; \tag{2}$$

$$D = \frac{1}{2}k_{bh}\dot{y}^2 + \frac{1}{2}(k_1+k_2)\dot{z}^2 + (k_1-k_2)\dot{z}\dot{\theta}L\cos\theta + \frac{1}{8}(k_1+k_2)\dot{\theta}^2L^2\cos^2\theta; \tag{3}$$

in the Rayleigh dissipation function D: $k_1$ and $k_2$ are friction coefficients between two sides of the crossbeam and a slide seat, $k_{bh}$ is a friction coefficient between the crossbeam and the moving part;
since the gantry crossbeam is a rigid structure, the potential energy is constant, i.e.:

$$V=0; \tag{4}$$

for the generalized three-degree-of-freedom coordinate system (Z, θ, Y), a corresponding generalized force is:

$$\begin{cases} F_z = F_1 - f_1 + F_2 - f_2 \\ F_\theta = [(F_1 - F_2) - (f_1 - f_2)]\frac{L}{2}\cos\theta \\ F_y = F_3 - f_3 \end{cases} \tag{5}$$

wherein, $F_i$ and $f_i$ (i=1,2,3) are a servomotor driving force and a friction force (i=1, 2, 3 represent directions along Z, θ, Y, respectively);

combining (2) to (5) and substituting into the Lagrange equation (6) with dissipation:

$$\frac{d}{dt}\left(\frac{\partial L}{\partial \dot{q}_j}\right) - \frac{\partial L}{\partial q_j} + \frac{\partial D}{\partial \dot{q}_j} = F_j \quad (6)$$

wherein: generalized coordinate $q_j=(Z,\theta,Y)$; generalized force $F_j=(F_z,F_\theta,F_y)$; L=T−V;

the differential equation in the crossbeam moving process of the gantry crossbeam mechanism is expressed as:

$$M\ddot{q}+C\dot{q}+H\dot{q}+Kq=F; \quad (7)$$

wherein, M, C and K are mass matrix, damping coefficient matrix and stiffness coefficient matrix, respectively; H is a Coriolis centripetal matrix; generalized coordinate vector: $q=(Z,\theta,Y)^T$; generalized force vector: $F=(F_z,F_\theta,F_y)^T$.

As a further solution of the present disclosure: in the step 13: in the actual moving process of the gantry crossbeam, the deflection angle θ is very small (θ<0.0001 rad), so it can be reduced to cos θ≈1; sin θ≈0, then the elements in the mass matrix M in (7) can be approximated as follows:

$$\begin{cases} M_{12} = M_{21} = my \\ M_{13} = M_{31} = 0 \end{cases}; \quad (8)$$

similarly, all elements in the Coriolis centripetal matrix can be ignored, i.e. H≈0; taking two equations about z and θ in the system dynamics equations for analysis, formula (7) can be simplified as:

$$M_s\ddot{q}_s+C_s\dot{q}_s+K_sq_s=F_s \quad (9)$$

$M_s$, $C_s$ and $K_s$ are simplified mass matrix, damping coefficient matrix, stiffness coefficient matrix, respectively; a simplified generalized coordinate vector: $q_s=(Z,\theta,Y)^T$; a simplified generalized force vector: $f_s=(F_z,F_\theta,F_y)^T$.

a form of each matrix in formula (9) is as follows:

$$\begin{cases} M = \begin{bmatrix} M+m & my \\ my & J+my^2 \end{bmatrix} \\ C = \begin{bmatrix} k_1+k_2 & 2m\dot{y}-L(k_1-k_2) \\ L(k_1-k_2) & 4m y \dot{y} \end{bmatrix} \\ K = \begin{bmatrix} 0 & 0 \\ 0 & \frac{1}{4}(k_1+k_2)L^2 \end{bmatrix} \\ F = \begin{bmatrix} F_z \\ F_\theta \end{bmatrix} \end{cases}; \quad (10)$$

for the y-axis, its independent kinematic differential equation is:

$$m\ddot{y}+k_{bh}\dot{y}=F_y-f_3 \quad (11)$$

As a further solution of the present disclosure: the step 2 includes:

Step 21: constructing a control model of the servo motor;

Step 22: constructing a servo system three-loop modeling; and

Step 23: completing a servo system three-loop parameter tuning.

As a further solution of the present disclosure: in the step 21: according to a mathematical model of permanent magnet motor under d-q coordinate system, a control method of $i_d=0$ is selected to realize the decoupling of d-axis and q-axis, and a control model of permanent magnet synchronous motor under $i_d=0$ control mode is obtained.

As a further solution of the present disclosure: in the step 22: based on the control model of permanent magnet synchronous motor, the servo control system is designed; current loop, speed loop and position loop are three interrelated closed-loop negative feedback systems based on PID controller, the servo control system controls the three loops of current loop, speed loop and position loop to achieve the purpose of controlling an output torque, running speed and output position of the motor.

As a further solution of the present disclosure: in the step 23: same motors are selected for both sides of double drive of the gantry machine tool crossbeam, and the unilateral servo system three-loop parameter tuning is carried out through the servo system three-loop modeling first, and then the gantry machine tool crossbeam is driven jointly by the two servo systems having the same control parameter, so as to realize synchronous control.

As a further solution of the present disclosure: in the step 4: DOB (disturbance observer) includes a transfer function P(s) of an object, a nominal model $P_n^{-1}(s)$ of an object, a disturbance observation $\hat{d}$, a control input r, a measurement noise ζ, a low-pass filter Q(s) and an equivalent disturbance d (conversion of external disturbance and modeling error of nominal model);

a design of the low-pass filter Q(s) affects an actual performance of the DOB, so a design problem of the DOB is transformed into a design problem of the low-pass filter Q(s), and the model of Q(s) is described as:

$$Q_{NM}(s) = \frac{\sum_{k=0}^{M} \frac{N!(\tau s)^k}{(N-k)!k!}}{(\tau s+1)^k}, M = 0, 1, \ldots, N-1; \quad (12)$$

wherein, τ is a time constant (reciprocal of cutoff frequency); N is a denominator order; M is a numerator order; N–M is the relative order;

an order of Q(s) affects a stability of the system, the larger the denominator order, the more stable the system is, and a phase lag phenomenon occurs in the high order of Q(s), weakening a compensation effect on the disturbance; the molecule order increase will offset the phase lag phenomenon and improve an ability of the system to resist disturbance, but it will destroy the stability of the system;

the nominal model $P_n(s)$ of the synchronization control system of the gantry crossbeam is obtained by the principle of parameter identification based on the least square method, and a driving torque signal is collected as input signal and a displacement signal of the crossbeam end is collected as output signal to identify the parameters of the control object; the obtained nominal model $P_n(s)$ is shown in (13):

$$P_n(s) = \frac{0.013}{s^2 + 0.038\,s + 1.351 \times 10^{-14}} \approx \frac{0.013}{s^2 + 0.038}; \quad (13)$$

taking model (13) as the nominal model of two axes, considering the control accuracy, system robustness and stability, a relative order of model (14) is 2 in all equations satisfying (12);

$$Q_{31}(s) = \frac{3(\tau s) + 1}{(\tau s)^3 + 3(\tau s)^2 + 3(\tau s) + 1}; \quad (14)$$

model (14) is a $Q_{31}(s)$ type low-pass filter with a time constant of $\tau=0.005$ s, which can be obtained as:

$$Q_{31}(s) = \frac{1.5 \times 10^{-2} s + 1}{1.25 \times 10^{-7} s^3 + 7.5 \times 10^{-6} s^2 + 1.5 \times 10^{-2} s + 1}; \quad (15).$$

Compared with the existing technology, the disclosure has the following beneficial effects: in practical application to large moving beam gantry machining centers, the present disclosure not only reduces the synchronization error caused by the torsion of the crossbeam due to mechanical structural differences, but also solves the synchronization error caused by the asymmetric load on both sides during the movement of the crossbeam moving parts, and improves the system robustness and stability.

DETAILED DESCRIPTION OF THE EMBODIMENTS

Technical solutions of the present disclosure will be clearly and completely described below with reference to the accompanying drawings in the embodiments of the present disclosure. Obviously, the described embodiments are only part of the embodiments of the present disclosure, not all of them. Based on the embodiments of the disclosure, all other embodiments made by those skilled in the art without sparing any creative effort should fall within the protection scope of the disclosure.

Figure 1:
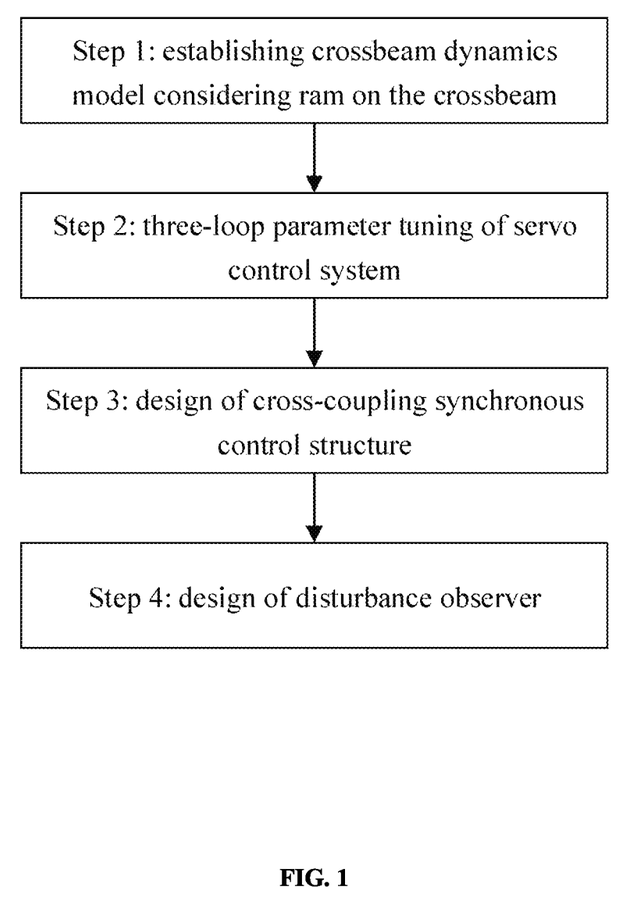
FIG. 1 is the flowchart of a cross-coupling control method for moving beam of gantry machine tool.

Referring to FIG. 1, a cross-coupling control method for moving beam of gantry machine tool includes:
- Step 1: establishing a crossbeam dynamics model considering a ram on the crossbeam, and at the same time simplifying the model for an observer design;
- Step 2: realizing a PID control parameter adjustment of motors at both ends in accordance with a method of parameter tuning of a unilateral servo control system; using a servo system with the same control parameters to jointly drive the crossbeam up and down (symmetrical structure on both sides), realizing the synchronous control;
- Step 3: using cross-coupling synchronous control to feedback a mutual influence between two axes, and designing a disturbance observer to compensate an output to the corresponding axis to constitute another closed-loop loop; and
- Step 4: designing a disturbance observer and compensating for the disturbance to improve a robustness of the system while reducing a synchronization error.

Figure 2:
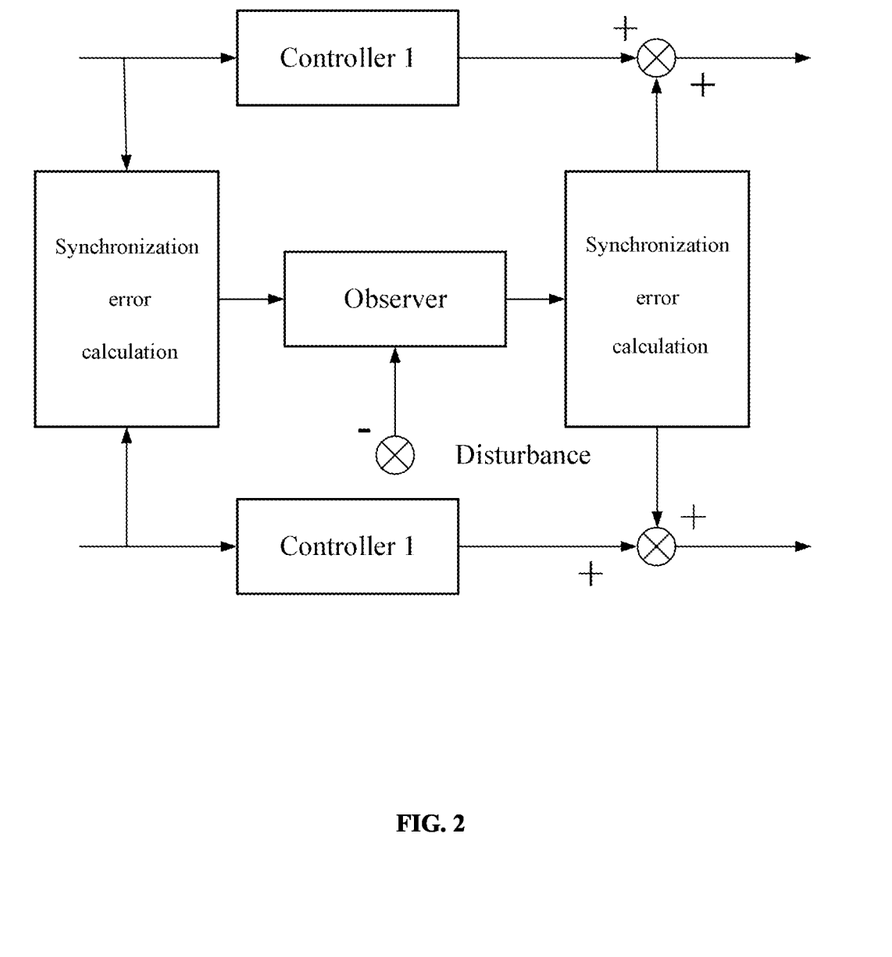
FIG. 2 shows the schematic diagram of the cross-coupling control.

In the specific embodiments: the change of the two axes (the change of the crossbeam) in the crossbeam dynamic model compensates the output to the corresponding axis through the disturbance observer, so as to improve the robustness of the system and reduce the synchronization error of the two axes. The cross-coupling is shown in FIG. 2.

In the step 3: the servo control system mainly includes the motor and the required designed observer, which controls the driving system through the three-loop parameter tuning of the motor and the observation results of the observer. The driving system includes a gantry beam driven by two ball screws, the position signals at both ends can be measured by the grating ruler and the encoder, and the position signals are fed back to the servo control system to construct a feedback compensation closed loop.

Figure 3:
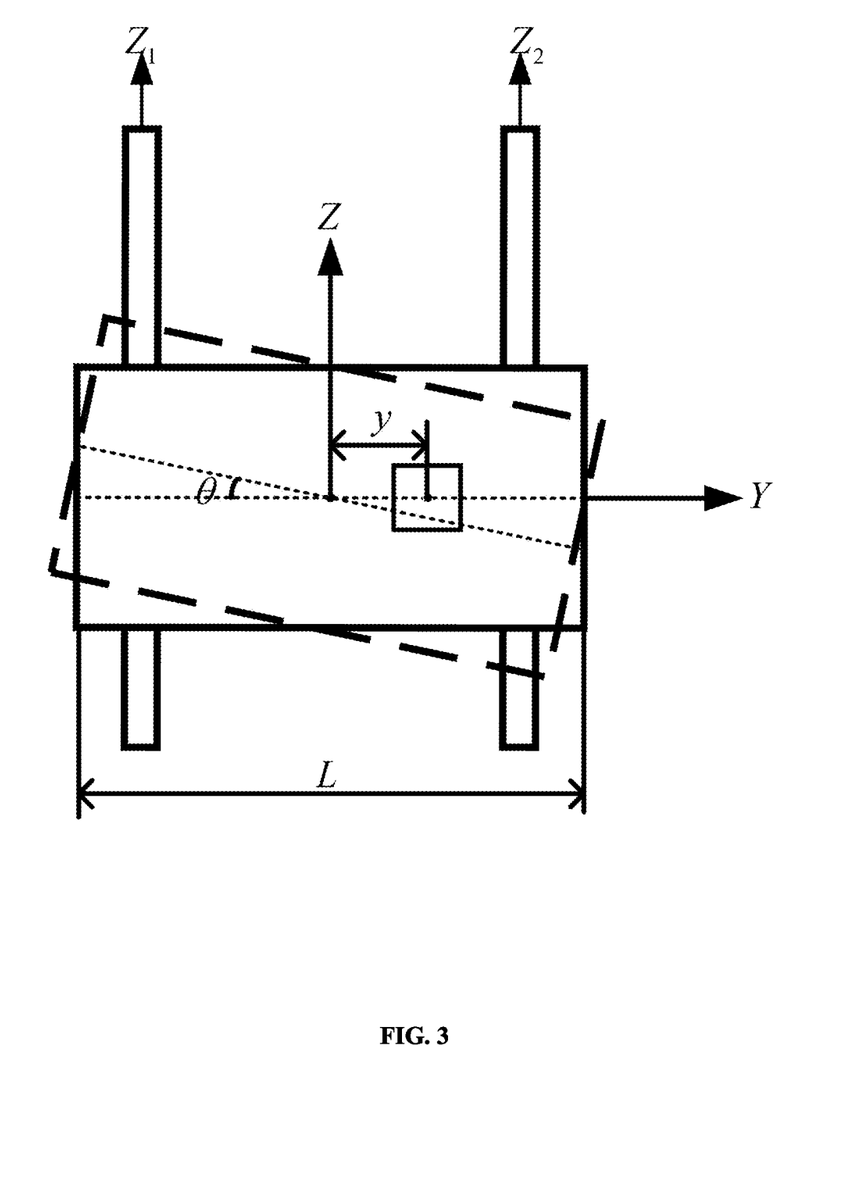
FIG. 3 is a schematic diagram of the synchronous drive structure of the gantry crossbeam.

In the present embodiment: referring to FIG. 3, the step 1 includes:
- Step 11: establishing a three-degree-of-freedom kinematic model of a crossbeam coupled body using a generalized three-degree-of-freedom coordinate system (Z, θ, Y) or a position coordinate system ($Z_1$, $Z_2$, Y);
- Step 12: obtaining a differential equation in a crossbeam moving process of the gantry crossbeam mechanism; and
- Step 13: simplifying the differential equation in the crossbeam moving process.

As a further solution of the present disclosure: in the step 11: the kinematic model of the crossbeam coupled body is established using a position coordinate system ($Z_1$, $Z_2$, Y) or a generalized three-degree-of-freedom coordinate system (Z, θ, Y):

$$\begin{cases} Z_1 = Z + \frac{L}{2}\sin\theta \\ Z_2 = Z - \frac{L}{2}\sin\theta \\ Y = Y \end{cases} \Leftrightarrow \begin{cases} Z = \frac{Z_1 + Z_2}{2} \\ \theta = \arcsin\left(\frac{Z_1 - Z_2}{L}\right) \\ Y = Y \end{cases}$$

the two models may be converted to each other, wherein:
θ is a deflection angle of the crossbeam, L is a span of the crossbeam, Z is a translational displacement of the crossbeam, Y is a displacement of a moving part from a center of gravity of the crossbeam, and $Z_1$ and $Z_2$ are translational displacements of the two axes.

The synchronous drive structure of the gantry crossbeam is generally driven by two identical servo motors to drive the ball screws of the $Z_1$ axis and $Z_2$ axis respectively to move the crossbeam up and down, while the ram and the tool holder (hereinafter referred to as the moving parts) on the crossbeam move on the Y-axis, which are regarded as a concentrated mass block, and the final result caused by the non-synchronous motion on both sides of the crossbeam is that the crossbeam will have a small angle torsion.

In the present embodiment: referring to FIG. 3, a gantry crossbeam rotational inertia J is expressed as:

$$J = \frac{ML^2}{12}; \tag{1}$$

to establish the differential equation in the crossbeam moving process according to the Lagrange equation, it is necessary to define energy expressions related to its dynamics in advance, including kinetic energy T, elastic potential energy V, Rayleigh dissipation function D, beam mass M; moving part mass m, the expressions are as follows:

$$T = \frac{1}{2}(M+m)\dot{z}^2 + \frac{1}{2}(J+my^2)\dot{\theta}^2 + \tag{2}$$

$$\frac{1}{2}m\dot{y}^2 + my\,\dot{z}\,\dot{\theta}\cos\theta + m\,\dot{z}\,\dot{y}\sin\theta;$$

$$D = \frac{1}{2}k_{bh}\,\dot{y}^2 + \frac{1}{2}(k_1+k_2)\dot{z}^2 + \tag{3}$$

$$(k_1-k_2)\dot{z}\,\dot{\theta}\,L\cos\theta + \frac{1}{8}(k_1+k_2)\dot{\theta}^2 L^2\cos^2\theta;$$

in the Rayleigh dissipation function D: $k_1$ and $k_2$ are friction coefficients between two sides of the crossbeam and a slide seat, $k_{bh}$ is a friction coefficient between the crossbeam and the moving part;

since the gantry crossbeam is a rigid structure, the potential energy is constant, i.e.:

$$V=0; \tag{4}$$

for the generalized three-degree-of-freedom coordinate system (Z, θ, Y), a corresponding generalized force is:

$$\begin{cases} F_z = F_1 - f_1 + F_2 - f_2 \\ F_\theta = [(F_1 - F_2) - (f_1 - f_2)]\frac{L}{2}\cos\theta \\ F_y = F_3 - f_3 \end{cases} \tag{5}$$

wherein, $F_i$ and $f_i$ (i=1,2,3) are a servomotor driving force and a friction force (i=1, 2, 3 represent directions along Z, θ, Y, respectively);

combining (2) to (5) and substituting into the Lagrange equation (6) with dissipation:

$$\frac{d}{dt}\left(\frac{\partial L}{\partial \dot{q}_j}\right) - \frac{\partial L}{\partial q_j} + \frac{\partial D}{\partial \dot{q}_j} = F_j \tag{6}$$

wherein: generalized coordinate $q_j=Z,\theta,Y$; generalized force $F_j=(F_z,F_\theta,F_y)$; L=T−V;

the differential equation in the crossbeam moving process of the gantry crossbeam mechanism is expressed as:

$$M\ddot{q}+C\dot{q}+H\dot{q}+Kq=F; \tag{7}$$

wherein, M, C and K are mass matrix, damping coefficient matrix and stiffness coefficient matrix, respectively; H is a Coriolis centripetal matrix; generalized coordinate vector: $q=(Z,\theta,Y)^T$; generalized force vector: $F=(F_z,F_\theta,F_y)^T$.

In the present embodiment: referring to FIG. 3, in the step 13: in the actual moving process of the gantry crossbeam, the deflection angle θ is very small (θ<0.0001 rad), so it can be reduced to cos θ≈1; sin θ≈0, then the elements in the mass matrix M in (7) can be approximated as follows:

$$\begin{cases} M_{12} = M_{21} = my \\ M_{13} = M_{31} = 0 \end{cases}; \tag{8}$$

similarly, all elements in the Coriolis centripetal matrix can be ignored, i.e. H≈0; taking two equations about z and θ in the system dynamics equations for analysis, formula (7) can be simplified as:

$$M_s\ddot{q}_s+C_s\dot{q}_s+K_s q_s=F_s \tag{9}$$

$M_s$, $C_s$ and $K_s$ are simplified mass matrix, damping coefficient matrix, stiffness coefficient matrix, respectively; a simplified generalized coordinate vector: $q_s=(Z,\theta,Y)^T$; a simplified generalized force vector: $F_s=(F_z,F_\theta,F^y)^T$.

a form of each matrix in formula (9) is as follows:

$$\begin{cases} M = \begin{bmatrix} M+m & my \\ my & J+my^2 \end{bmatrix} \\ C = \begin{bmatrix} k_1+k_2 & 2m\,\dot{y}-L(k_1-k_2) \\ L(k_1-k_2) & 4my\,\dot{y} \end{bmatrix} \\ K = \begin{bmatrix} 0 & 0 \\ 0 & \frac{1}{4}(k_1+k_2)L^2 \end{bmatrix} \\ F = \begin{bmatrix} F_z \\ F_\theta \end{bmatrix} \end{cases} \tag{10}$$

for the y-axis, its independent kinematic differential equation is:

$$m\,\ddot{y}+k_{bh}\dot{y}=F_y-f_3 \tag{11}$$

In the present embodiment: the step 2 includes:

Step 21: constructing a control model of the servo motor;
Step 22: constructing a servo system three-loop modeling; and
Step 23: completing a servo system three-loop parameter tuning.

Figure 4:
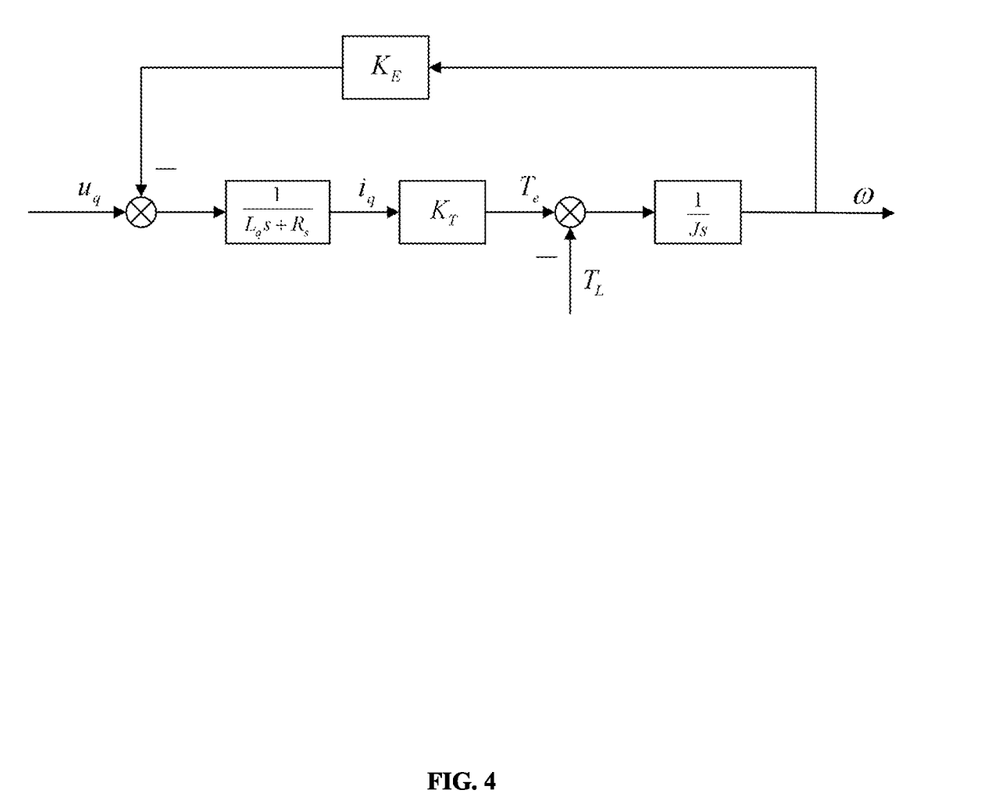
FIG. 4 shows the control structure diagram of a permanent magnet synchronous motor in the d-q coordinate system.

In the present embodiment: referring to FIG. 4, in the step 21: according to a mathematical model of permanent magnet motor under d-q coordinate system, a control method of $i_d=0$ is selected to realize the decoupling of d-axis and q-axis, and a control model of permanent magnet synchronous motor under $i_d=0$ control mode is obtained.

In FIG. 4: $K_E=n_p\psi_f$, which is called the back electromotive force coefficient of the motor. $K_T=1.5n_p\psi_f$, which is called motor torque constant ($n_p$ is the number of magnetic poles; $\psi_f$ is the magnetic linkage of permanent magnet).

Figure 5:
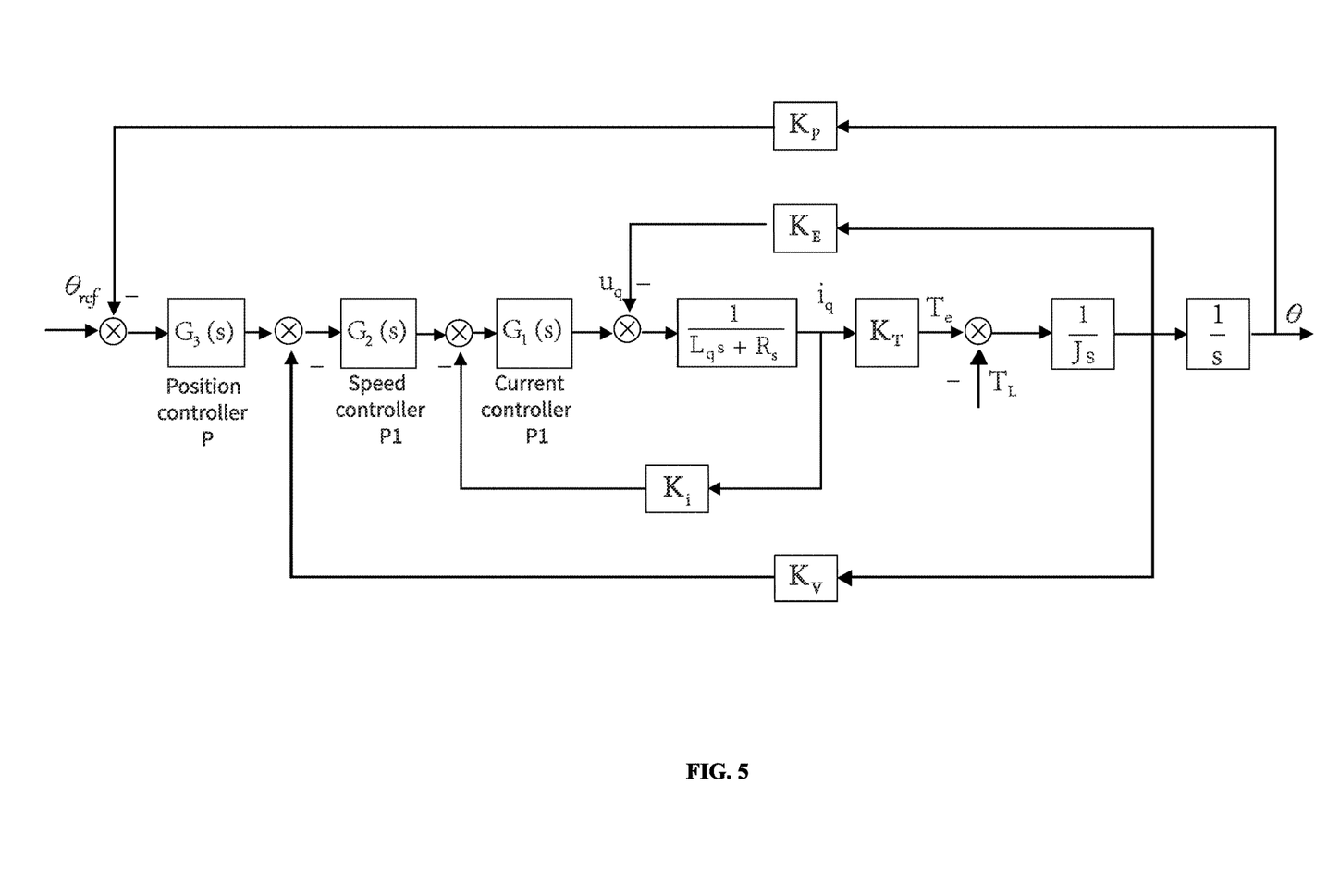
FIG. 5 shows the control block diagram of the servo system.

In the present embodiment: referring to FIG. 5, in the step 22: based on the control model of permanent magnet synchronous motor, the servo control system is designed; current loop, speed loop and position loop are three interrelated closed-loop negative feedback systems based on PID controller, the servo control system controls the three loops of current loop, speed loop and position loop to achieve the purpose of controlling an output torque, running speed and output position of the motor.

In FIG. 5, the PI controller is used in the current loop and speed loop, and the P controller is used in the position loop. Kp, Kv and Ki are the feedback coefficients of the position loop, speed loop and current loop respectively. Therefore, the current loop and the speed loop need to tune the proportional coefficient and the integral time constant, while the position loop only needs to tune the proportional coefficient.

Figure 6:
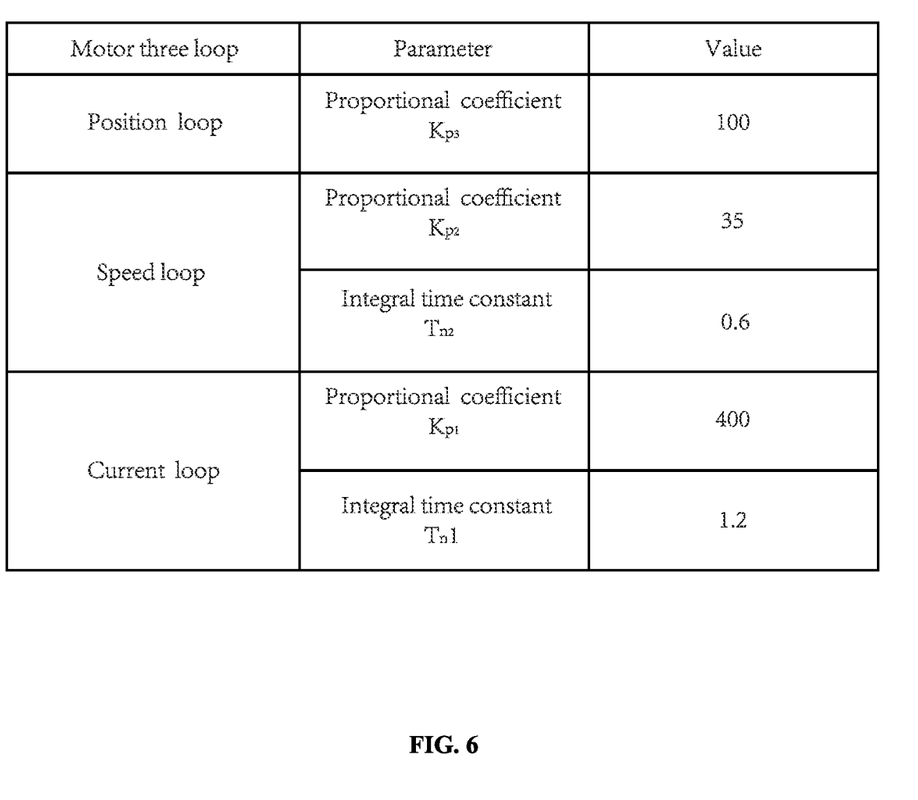
FIG. 6 is a schematic diagram of the three-loop parameters of the motor.

In the present embodiment: referring to FIG. 6, in the step 23: same motors are selected for both sides of double drive of the gantry machine tool crossbeam, and the unilateral servo system three-loop parameter tuning is carried out through the servo system three-loop modeling first, and then the gantry machine tool crossbeam is driven jointly by the two servo systems having the same control parameter, so as to realize synchronous control.

The tuning results of each parameter using the PID Tuner tool in MATLAB/Simulink are shown in FIG. 6.

Figure 7:
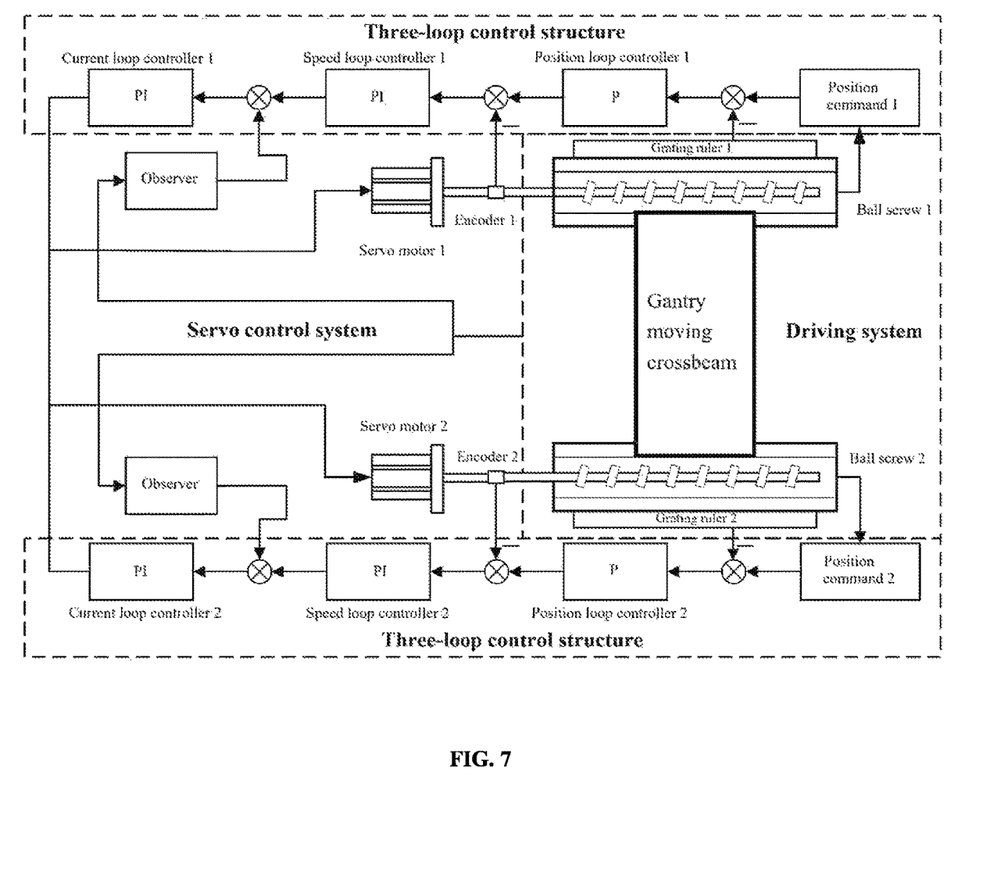
FIG. 7 is a schematic diagram of the cross-coupling synchronous control structure of the gantry machine tool.

In the present embodiment: referring to FIG. 7, in the step 3: the schematic diagram of the cross-coupling synchronous control structure of the synchronous drive of the gantry machine tool crossbeam is shown in FIG. 7. The servo control system mainly includes the motor and the required designed observer, which controls the driving system through the three-loop parameter tuning of the motor and the observation results of the observer. The driving system includes a gantry beam driven by two ball screws, the position signals at both ends can be measured by the grating ruler and the encoder, and the position signals are fed back to the servo control system.

Figure 8:
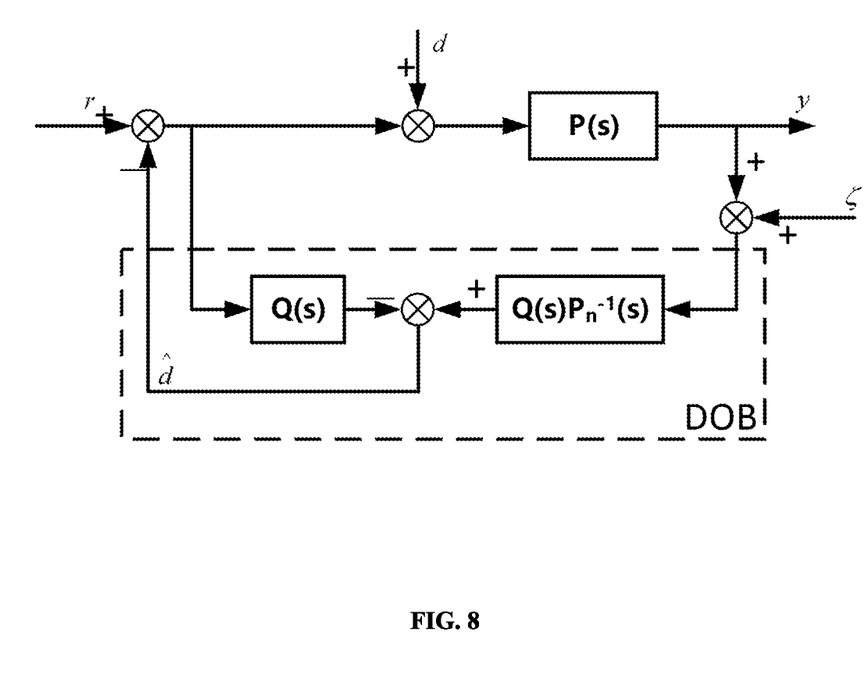
FIG. 8 shows the internal structure of DOB.

In the present embodiment: referring to FIG. 8, in the step 4: DOB (disturbance observer) includes a transfer function P(s) of an object, a nominal model $P_n^{-1}(s)$ of an object, a disturbance observation $\hat{d}$, a control input r, a measurement noise $\zeta$, a low-pass filter Q(s) and an equivalent disturbance d (conversion of external disturbance and modeling error of nominal model);

a design of the low-pass filter Q(s) affects an actual performance of the DOB, so a design problem of the DOB is transformed into a design problem of the low-pass filter Q(s), and the model of Q(s) is described as:

$$Q_{NM}(s) = \frac{\sum_{k=0}^{M} \frac{N!(\tau s)^k}{(N-k)!k!}}{(\tau s+1)^k}, M = 0, 1, \ldots, N-1; \quad (12)$$

wherein, $\tau$ is a time constant (reciprocal of cutoff frequency); N is a denominator order; M is a numerator order; N-M is the relative order;

an order of Q(s) affects a stability of the system, the larger the denominator order, the more stable the system is, and a phase lag phenomenon occurs in the high order of Q(s), weakening a compensation effect on the disturbance; the molecule order increase will offset the phase lag phenomenon and improve an ability of the system to resist disturbance, but it will destroy the stability of the system;

the nominal model $P_n(s)$ of the synchronization control system of the gantry crossbeam is obtained by the principle of parameter identification based on the least square method, and a driving torque signal is collected as input signal and a displacement signal of the crossbeam end is collected as output signal to identify the parameters of the control object; the obtained nominal model $P_n(s)$ is shown in (13):

$$P_n(s) = \frac{0.013}{s^2 + 0.038s + 1.351 \times 10^{-14}} \approx \frac{0.013}{s^2 + 0.038}; \quad (13)$$

taking model (13) as the nominal model of two axes, considering the control accuracy, system robustness and stability, a relative order of model (14) is 2 in all equations satisfying (12);

$$Q_{31}(s) = \frac{3(\tau s) + 1}{(\tau s)^3 + 3(\tau s)^2 + 3(\tau s) + 1}; \quad (14)$$

model (14) is a $Q_{31}(s)$ type low-pass filter with a time constant of $\tau=0.005$ s, which can be obtained as:

$$Q_{31}(s) = \frac{1.5 \times 10^{-2}s + 1}{1.25 \times 10^{-7}s^3 + 7.5 \times 10^{-6}s^2 + 1.5 \times 10^{-2}s + 1}; \quad (15).$$

Figure 9:
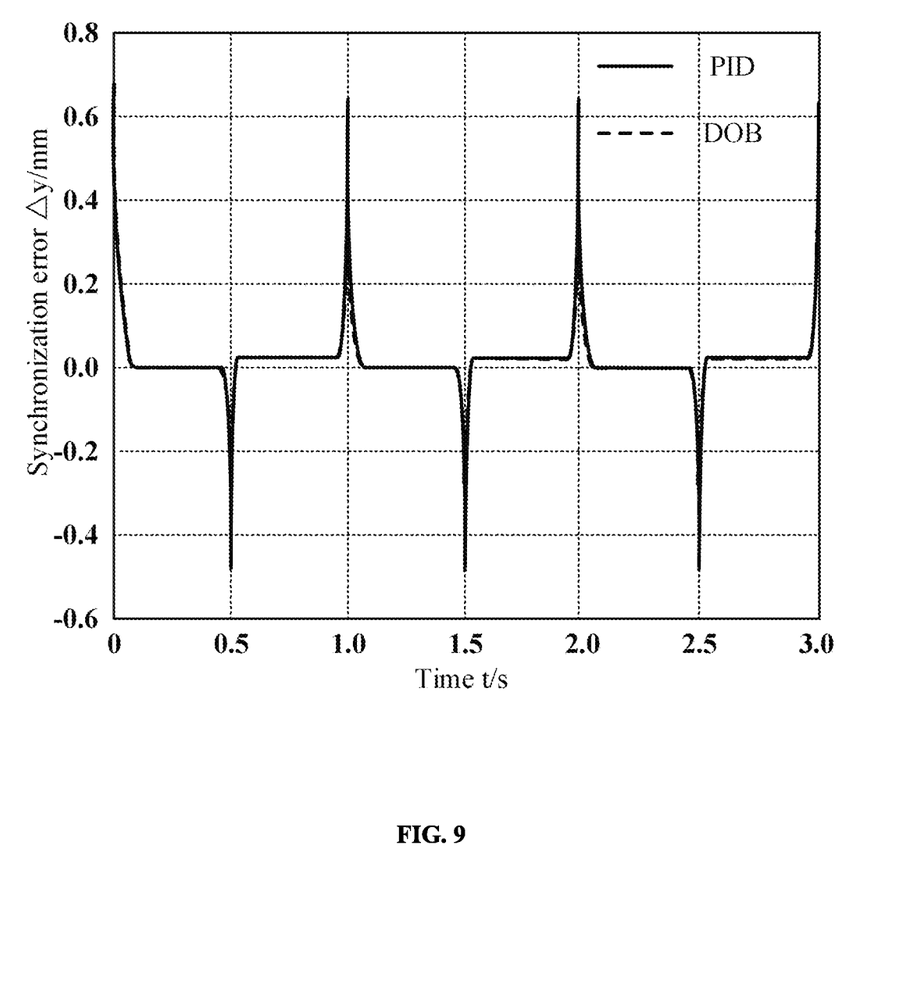
FIG. 9 is a schematic diagram of synchronization error during the movement of moving parts on the crossbeam.
Figure 10:
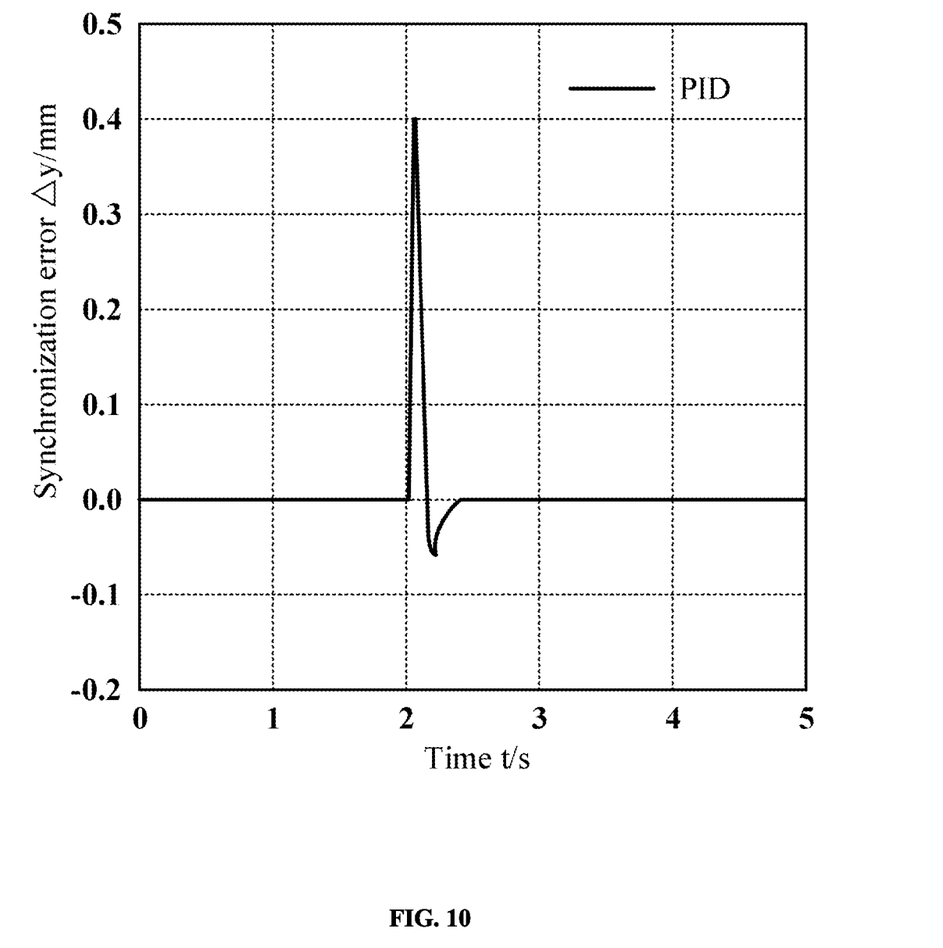
FIG. 10 is a schematic diagram of the synchronization error of the PID controller under step disturbance.
Figure 11:
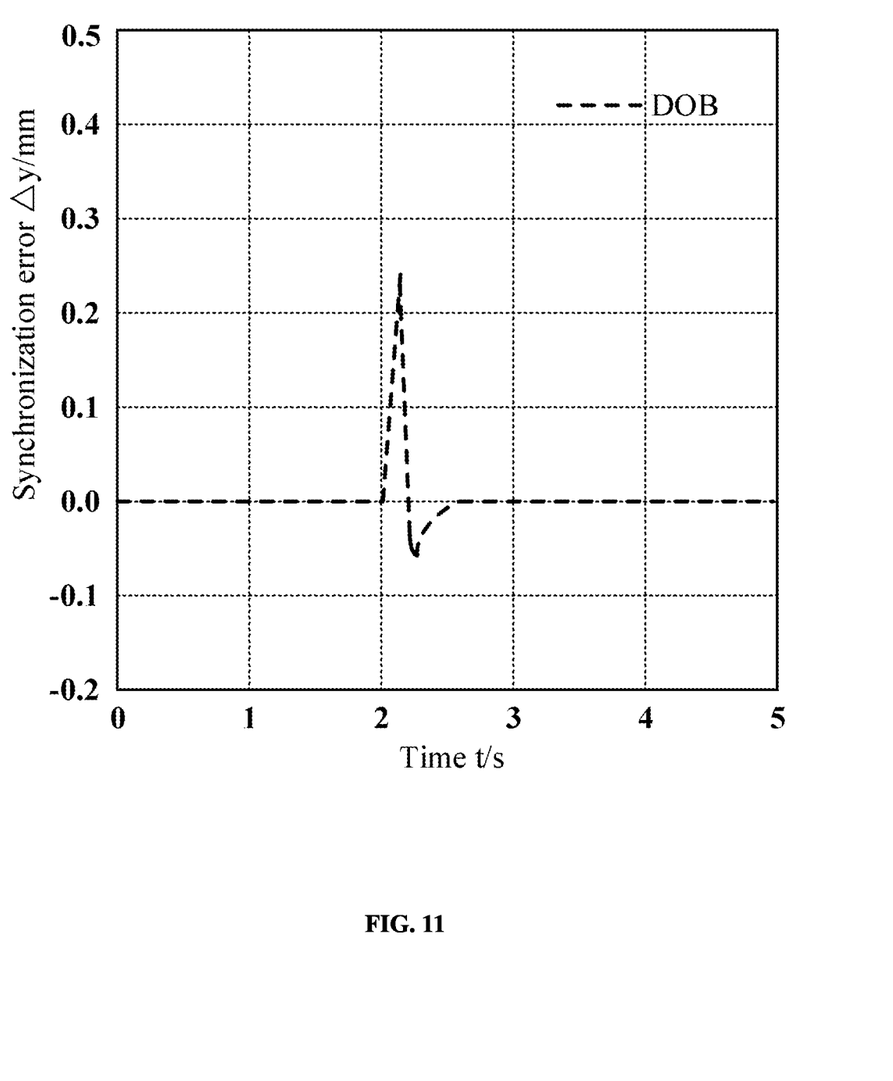
FIG. 11 is a schematic diagram of the synchronization error of the DOB observer under step disturbance.

In the specific embodiment: referring to FIG. 9, FIG. 10, FIG. 11, the verification test results of the control algorithm show that the use of the DOB observer has a good ability to adjust the synchronization error caused by changes in the center of gravity of the crossbeam (FIG. 9), with a maximum synchronization error of 0.33 mm, which has a good compensation effect compared to the maximum synchronization error of 0.48 mm using traditional PID controllers. When subjected to step disturbance (FIG. 10, FIG. 11), the synchronization error adjustment time of the DOB observer is 0.8 s, which is larger than 0.5 s of the PID controller, but the maximum synchronization error is only 0.24 mm far less than the 0.4 mm of the PID controller. The above results show that the disturbance suppression performance and system stability of crossbeam synchronous control are significantly improved with the addition of DOB observer.

It is apparent to those skilled in the art that the present disclosure is not limited to the details of the above exemplary embodiments, and that it is capable of being realized in other specific forms without departing from the spirit or essential features of the present disclosure. Accordingly, the embodiments are to be regarded as exemplary and non-limiting in every point of view, and the scope of the present disclosure is limited by the appended claims and not by the foregoing description, and is therefore intended to encompass all variations falling within the meaning and scope of the equivalent elements of the claims. Any accompanying markings in the claims should not be regarded as limiting the claims to which they relate.

In addition, it should be understood that although the specification is described in accordance with the embodiments, not each embodiment contains only one independent technical solution, and the specification is recited in such a manner only for the sake of clarity, and those skilled in the art should take the specification as a whole, and the technical solutions in the embodiments may be combined appropriately to form other embodiments that can be understood by those skilled in the art.

What is claimed is:

1. A cross-coupling control method for moving beam of gantry machine tool, wherein:
the cross-coupling control method for moving beam of gantry machine tool comprises:
Step 1: establishing a crossbeam dynamics model considering a ram on the crossbeam, and at the same time simplifying the model for an observer design;
Step 2: realizing a PID control parameter adjustment of motors at both ends in accordance with a method of parameter tuning of a unilateral servo control system; using a servo system with the same control parameters to jointly drive the crossbeam up and down, realizing the synchronous control;
Step 3: using cross-coupling synchronous control to feedback a mutual influence between two axes, and designing a disturbance observer to compensate an output to the corresponding axis to constitute another closed-loop loop; and
Step 4: designing a disturbance observer and compensating for the disturbance to improve a robustness of the system while reducing a synchronization error.

2. The cross-coupling control method for moving beam of gantry machine tool of claim 1, wherein the step 1 comprises:
Step 11: establishing a three-degree-of-freedom kinematic model of a crossbeam coupled body using a generalized three-degree-of-freedom coordinate system or a position coordinate system;
Step 12: obtaining a differential equation in a crossbeam moving process of the gantry crossbeam mechanism; and
Step 13: simplifying the differential equation in the crossbeam moving process.

3. The cross-coupling control method for moving beam of gantry machine tool of claim 2, wherein in the step 11: the kinematic model of the crossbeam coupled body is established using a position coordinate system or a generalized three-degree-of-freedom coordinate system:

$$\begin{cases} Z_1 = Z + \frac{L}{2}\sin\theta \\ Z_2 = Z - \frac{L}{2}\sin\theta \\ Y = Y \end{cases} \Leftrightarrow \begin{cases} Z = \frac{Z_1 + Z_2}{2} \\ \theta = \arcsin\left(\frac{Z_1 - Z_2}{L}\right) \\ Y = Y \end{cases}$$

the two models may be converted to each other, wherein: θ is a deflection angle of the crossbeam, L is a span of the crossbeam, Z is a translational displacement of the crossbeam, Y is a displacement of a moving part from a center of gravity of the crossbeam, and $Z_1$ and $Z_2$ are translational displacements of the two axes.

4. The cross-coupling control method for moving beam of gantry machine tool of claim 2, wherein in the step 12: a gantry crossbeam rotational inertia J is expressed as:

$$J = \frac{ML^2}{12}; \quad (1)$$

to establish the differential equation in the crossbeam moving process according to the Lagrange equation, it is necessary to define energy expressions related to its dynamics in advance, including kinetic energy T, elastic potential energy V, Rayleigh dissipation function D, beam mass M; moving part mass m, the expressions are as follows:

$$T = \frac{1}{2}(M+m)\dot{z}^2 + \frac{1}{2}(J+my^2)\dot{\theta}^2 + \frac{1}{2}m\dot{y}^2 + my\dot{z}\dot{\theta}\cos\theta + m\dot{z}\dot{y}\sin\theta; \quad (2)$$

$$D = \frac{1}{2}k_{bh}\dot{y}^2 + \frac{1}{2}(k_1+k_2)\dot{z}^2 + (k_1-k_2)\dot{z}\dot{\theta}L\cos\theta + \frac{1}{8}(k_1+k_2)\dot{\theta}^2L^2\cos^2\theta; \quad (3)$$

in the Rayleigh dissipation function D: $k_1$ and $k_2$ are friction coefficients between two sides of the crossbeam and a slide seat, $k_{bh}$ is a friction coefficient between the crossbeam and the moving part;
since the gantry crossbeam is a rigid structure, the potential energy is constant, i.e.:

$$V = 0; \quad (4)$$

for the generalized three-degree-of-freedom coordinate system, a corresponding generalized force is:

$$\begin{cases} F_z = F_1 - f_1 + F_2 - f_2 \\ F_\theta = [(F_1 - F_2) - (f_1 - f_2)]\frac{L}{2}\cos\theta \\ F_y = F_3 - f_3 \end{cases} \quad (5)$$

wherein, $F_i$ and $f_i$ are a servomotor driving force and a friction force;
combining (2) to (5) and substituting into the Lagrange equation (6) with dissipation:

$$\frac{d}{dt}\left(\frac{\partial L}{\partial \dot{q}_j}\right) - \frac{\partial L}{\partial q_j} + \frac{\partial D}{\partial \dot{q}_j} = F_j \quad (6)$$

wherein: generalized coordinate $q_j=(Z,\theta,Y)$; generalized force $F_j=(F_z,F_\theta,F_y)$; L=T−V;
the differential equation in the crossbeam moving process of the gantry crossbeam mechanism is expressed as:

$$M\ddot{q} + C\dot{q} + H\dot{q} + Kq = F; \quad (7)$$

wherein, M, C and K are mass matrix, damping coefficient matrix and stiffness coefficient matrix, respectively; H is a Coriolis centripetal matrix; generalized coordinate vector: $q=(Z,\theta,Y)^T$; generalized force vector: $F=(F_z,F_\theta,F_y)^T$.

5. The cross-coupling control method for moving beam of gantry machine tool of claim 2, wherein in the step 13: in the actual moving process of the gantry crossbeam, cos θ≈1; sin θ≈0, then the elements in the mass matrix M in (7) are:

$$\begin{cases} M_{12} = M_{21} = my \\ M_{13} = M_{31} = 0 \end{cases}; \quad (8)$$

in the Coriolis centripetal matrix, H≈0; taking two equations about z and θ in the system dynamics equations for analysis, formula (7) can be simplified as:

$$M_s\ddot{q}_s + C_s\dot{q}_s + K_sq_s = F_s \quad (9)$$

$M_s$, $C_s$ and $K_s$ are simplified mass matrix, damping coefficient matrix, stiffness coefficient matrix, respectively; a simplified generalized coordinate vector: $q_s=(Z,\theta,Y)^T$; a simplified generalized force vector: $F_s=(F_z,F_\theta,F_y)^T$;

a form of each matrix in formula (9) is as follows:

$$\begin{cases} M = \begin{bmatrix} M+m & my \\ my & J+my^2 \end{bmatrix} \\ C = \begin{bmatrix} k_1+k_2 & 2m\dot{y}-L(k_1-k_2) \\ L(k_1-k_2) & 4my\dot{y} \end{bmatrix} \\ K = \begin{bmatrix} 0 & 0 \\ 0 & \frac{1}{4}(k_1+k_2)L^2 \end{bmatrix} \\ F = \begin{bmatrix} F_z \\ F_\theta \end{bmatrix} \end{cases} \quad (10)$$

for the y-axis, its independent kinematic differential equation is:

$$m\ddot{y}+k_{bh}\dot{y}=F_y-f_3 \quad (11).$$

6. The cross-coupling control method for moving beam of gantry machine tool of claim 1, wherein the step 2 comprises:
   Step 21: constructing a control model of the servo motor;
   Step 22: constructing a servo system three-loop modeling; and
   Step 23: completing a servo system three-loop parameter tuning.

7. The cross-coupling control method for moving beam of gantry machine tool of claim 6, wherein in the step 21: according to a mathematical model of permanent magnet motor under d-q coordinate system, a control method of $i_d=0$ is selected to realize the decoupling of d-axis and q-axis, and a control model of permanent magnet synchronous motor under $i_d=0$ control mode is obtained.

8. The cross-coupling control method for moving beam of gantry machine tool of claim 6, wherein in the step 22: based on the control model of permanent magnet synchronous motor, the servo control system is designed; current loop, speed loop and position loop are three interrelated closed-loop negative feedback systems based on PID controller, the servo control system controls the three loops of current loop, speed loop and position loop to achieve the purpose of controlling an output torque, running speed and output position of the motor.

9. The cross-coupling control method for moving beam of gantry machine tool of claim 6, wherein in the step 23: same motors are selected for both sides of double drive of the gantry machine tool crossbeam, and the unilateral servo system three-loop parameter tuning is carried out through the servo system three-loop modeling first, and then the gantry machine tool crossbeam is driven jointly by the two servo systems having the same control parameter, so as to realize synchronous control.

10. The cross-coupling control method for moving beam of gantry machine tool of claim 1, wherein in the step 4: DOB comprises a transfer function P(s) of an object, a nominal model $P_n^{-1}(s)$ of an object, a disturbance observation $\hat{d}$, a control input r, a measurement noise $\zeta$, a low-pass filter Q(s) and an equivalent disturbance d;
   a design of the low-pass filter Q(s) affects an actual performance of the DOB, so a design problem of the DOB is transformed into a design problem of the low-pass filter Q(s), and the model of Q(s) is described as:

$$Q_{NM}(s) = \frac{\sum_{k=0}^{M} \frac{N!(\tau s)^k}{(N-k)!k!}}{(\tau s+1)^k}, M = 0, 1, \ldots, N-1; \quad (12)$$

wherein, $\tau$ is a time constant; N is a denominator order; M is a numerator order; N–M is the relative order;
an order of Q(s) affects a stability of the system, the larger the denominator order, the more stable the system is, and a phase lag phenomenon occurs in the high order of Q(s), weakening a compensation effect on the disturbance; the molecule order increase will offset the phase lag phenomenon and improve an ability of the system to resist disturbance, but it will destroy the stability of the system;
the nominal model $P_n(s)$ of the synchronization control system of the gantry crossbeam is obtained by the principle of parameter identification based on the least square method, and a driving torque signal is collected as input signal and a displacement signal of the crossbeam end is collected as output signal to identify the parameters of the control object; the obtained nominal model $P_n(s)$ is shown in (13):

$$P_n(s) = \frac{0.013}{s^2+0.038s+1.351\times10^{-14}} \approx \frac{0.013}{s^2+0.038}; \quad (13)$$

taking model (13) as the nominal model of two axes, considering the control accuracy, system robustness and stability, a relative order of model (14) is 2 in all equations satisfying (12);

$$Q_{31}(s) = \frac{3(\tau s)+1}{(\tau s)^3+3(\tau s)^2+3(\tau s)+1}; \quad (14)$$

model (14) is a $Q_{31}(s)$ type low-pass filter with a time constant of $\tau=0.005$ s, which can be obtained as:

$$Q_{31}(s) = \frac{1.5\times10^{-2}s+1}{1.25\times10^{-7}s^3+7.5\times10^{-6}s^2+1.5\times10^{-2}s+1}; \quad (15).$$

* * * * *